United States Patent [19]

Burkat

[11] Patent Number: 5,529,382
[45] Date of Patent: Jun. 25, 1996

[54] PASSENGER RESTRAINT SYSTEM

[75] Inventor: Alexander Burkat, Placentia, Calif.

[73] Assignee: The Walt Disney Company, Burbank, Calif.

[21] Appl. No.: 228,437

[22] Filed: Apr. 15, 1994

[51] Int. Cl.$^6$ .......................... A47C 31/12; A47D 15/00; B60R 22/00
[52] U.S. Cl. .......................... 297/487; 297/488; 297/486; 280/748
[58] Field of Search .................................... 297/486, 487, 297/488; 280/748

[56] References Cited

U.S. PATENT DOCUMENTS

| | | | |
|---|---|---|---|
| 3,741,330 | 6/1973 | Monaghan | 280/150 X |
| 3,888,329 | 6/1975 | Monaghan | 297/488 X |
| 3,899,042 | 8/1975 | Bonar | 297/487 |
| 5,129,478 | 7/1992 | Suenaga et al. | 297/487 X |

Primary Examiner—Peter M. Cuomo
Assistant Examiner—Rodney B. White
Attorney, Agent, or Firm—Hecker & Harriman

[57] ABSTRACT

An over-the-shoulder passenger restraint system that operates in three modes and permits fine adjustments of two pairs of pivoting elements, one pair located behind and above the passenger's shoulders, the second pair located in front of the passenger is described. Fine adjustments permit the securing of guests of varying sizes, from small children to tall or overweight adults. The restraint fits each person snugly, thus minimizing potential of injuries while also not blocking the view of a show or scenery around which a ride is themed. The restraint system is also very safe; when passengers are boarding the ride, the restraint cannot be moved, making it useful for balance. After passengers are seated, the restraint can only be pulled downward toward the passenger. During the ride, the restraint is locked and cannot move up or down. When passengers are exiting the ride, the restraint can only be moved upward and away from the passenger. The new restraint system has two pairs of pivoting points that allow a close fit of both the upper and lower restraint elements. This configuration allows the upper element to rest on the passenger's shoulder, thus providing the passenger a clear view and not presenting a head impact surface during lateral shaking of the vehicle. The lower elements rests against the passenger's abdomen, thus preventing longitudinal movement of the passenger's lower torso, keeping the passenger in the proper position.

23 Claims, 7 Drawing Sheets

PASSENGER RESTRAINT SYSTEM

BACKGROUND OF THE INVENTION

1. Field of the Invention

This invention relates to a passenger restraint system.

2. Background Art

There are amusement attractions that involve transportation of passengers in a moving car or other vehicle. As a safety precaution, passenger restraint systems are provided that serve to keep the passenger in place, and to limit movement of the passenger during operation of the attraction. The type of restraint used depends on the type of attraction. For example, relatively slow moving attractions, or attractions that have little variation in direction of travel, can use seatbelts or a "lap bar" as a means of passenger restraint. Faster moving attractions, or attractions that include rapid changes of directions, may use a locking lap bar that is pressed against the passenger, limiting movement of the passenger. In other attractions, such as roller coasters, and particularly those that involve inverted or "loop the loop" travel, an over the shoulder yoke or restraint bar is often used.

Most prior art over-the-shoulder restraints used in ride vehicles are of a two-mode, single-pivot type. These designs are often "U-shaped" when viewed from the front, and straight or "L-shaped" when viewed from the side. They are characterized by a single pivot point located behind and above the passenger, allowing the restraint bar to pivot up away from the passenger for entry and exit, and pivot down against the passenger's chest during operation of the attraction. These prior art restraint systems typically have tall side pieces that fit short people and children poorly and block their view of a show or scenery while riding the ride. Because the restraint bar often extends adjacent the passenger's head, they can also cause injury to guests whose heads are forced against the restraint. Additionally, some of the known designs have a coarse adjustment means which prevents close fitting of the restraint to all passengers. Other known restraints can be tightened during the ride due to guests' motion thus making it quite uncomfortable to guests. In addition, prior art passenger restraint systems often are hydraulic, adding to the expense and complexity (and consequently, possible failure) of the system.

U.S. Pat. No. 4,005,877 to Humphries discloses a hydraulic restraint system utilizing a unitary U-shaped restraint arm. However, it is not a dual-pivot system and does not allow for fine adjustment.

Eyerly, U.S. Pat. No. 2,165,698 is directed to a passenger car for an amusement device. The car of Eyerly includes a restraint bar that is pivotally mounted behind the shoulders of a passenger The bar pivots downward and rests on the lap of the passenger.

A passenger shield is described in Graham, U.S. Pat. No. 3,129,017. The device is a chest harness pivotally mounted behind the passenger and that swings down over the chest of the passenger. A lower locking device engages the bottom of the harness to hold it in place.

Doehler, U.S. Pat. No. 3,640,572, describes a vehicle safety guard of holding a person in a seat in case of accident. A horizontal restraint bar is attached to a single arm, in turn pivotally mounted behind the passenger. The arm swings down to press the restraint bar against the torso of the passenger.

U.S. Pat. No. 3,713,694 to Miller is directed to a body restraining device for a vehicle. Two shoulder restraint pads, pivotally mounted behind the back of the passenger, are swung into and out of restraining position by a lever mounted near the floor of the seat.

Ezquerra, U.S. Pat. No. 3,722,951 describes a restraint device for use in an automobile. The device is normally located resting against the passengers chest. During a sudden deceleration, the device swings slightly upward to receive the passengers face, preventing the passenger from being ejected from the car or hitting the windshield, dashboard, steering wheel, etc.

U.S. Pat. No. 3,829,158 to O'Conner is a vehicle seat harness that is used in automobiles. The harness is coupled to the back of the seat and then rests on the front torso of the passenger of the vehicle.

A vehicle occupant restraining system is described in Hilyard, U.S. Pat. No. 3,837,670. The system is a U-shaped pendulum device that is normally stored above the head of a passenger. The pendulum, pivotally mounted behind the back of the passenger, is swung in front of the torso of the passenger to provide protection.

U.S. Pat. No. 3,901,550 to Hamy is a passive restraint system consisting of over the shoulder curved restraint members. The restraint devices focus on the shoulder, eliminating the discomfort of across the chest restraint systems.

Schubert, U.S. Pat. No. 3,929,349 is directed to a protective device for vehicles. A roof mounted padded restraint is normally disposed against the torso of the driver. For exit, the device is lifted up away from the driver, but in the vision of the driver. The device must be properly used to permit driving of the vehicle.

A shell shaped children's seat is described in Tomforde, U.S. Pat. No. 4,039,225. The seat includes a rigid front panel that events the child from forward motion in the seat and blocks collision with objects in front of the direction of travel of the seat.

A horizontal single pivot cross bar restraining member is described in Cone, U.S. Pat. No. 4,343,510. The device is for use in a child's car seat.

Schmutz, U.S. Pat. No. 4,700,632 is directed to a device to retain roller coaster passengers in a standing position. A single pivoting arm includes a cross bar restraint that, along with a fixed side bar member, defines a harness for restraining a passenger.

An integral child restraint system is described in Steward, U.S. Pat. No. 4,900,086. The system includes a pivotally mounted U shaped restraining bar whose horizontal portion rests against the torso of a child. The pivot point it above and behind the seated child.

SUMMARY OF THE INVENTION

A passenger restraint system is described that allows the restraint to fit comfortably, yet closely, around a passenger, regardless of the passenger's height or other physical characteristics. In addition, the restraint system is such that it does not block the passenger's view of scenery or a show associated with the ride experience. The system includes automatic locking to prevent accidental release of the restraint during the operation of the attraction. The system is a mechanical system utilizing no hydraulics.

This invention comprises an over-the-shoulder passenger restraint system that operates in three modes and permits fine adjustments of two pairs of pivoting elements, one pair located behind and above the passenger's shoulders, the second pair located in front of the passenger. These fine adjustments permit the securing of guests of varying sizes, from small children to tall or overweight adults. The restraint fits each person snugly, thus minimizing potential of injuries while also not blocking the view of a show or scenery around which a ride is themed. The restraint system is also very safe; when passengers are boarding the ride, the restraint cannot be moved, making it useful for balance. After passengers are seated, the restraint can only be pulled downward toward the passenger. During the ride, the restraint is locked and cannot move up or down. When passengers are exiting the ride, the restraint can only be moved upward and away from the passenger.

The new restraint system has two pairs of pivoting points that allow a close fit of both the upper and lower restraint elements. This configuration allows the upper element to rest on the passenger's shoulder, thus providing the passenger a clear view and not presenting a head impact surface during lateral movement of the vehicle. The lower elements rests against the passenger's abdomen, thus preventing longitudinal movement of the passenger's lower torso, keeping the passenger in the proper position. The system is entirely mechanical, so that it does not require a complex hydraulic system in the manner than many prior art systems do. The system is fail-safe; it cannot be moved upward or downward should a system pneumatic air failure occur.

DETAILED DESCRIPTION OF THE INVENTION

In the following description, numerous specific details are set forth in order to provide a more thorough understanding of the present invention. It will be apparent, however, to one skilled in the art, that the present invention may be practiced without these specific details. In other instances, well-known features have not been described in detail in order not to unnecessarily obscure the present invention.

The attached drawings and schematic illustrate the new restraint system design. The restraint mechanism is all mechanical and pneumatic. The present invention utilizes clutches to prevent movement in one or both of two directions as desired. The clutches in the preferred embodiment are tooth clutches. Two halves of a clutch are kept engaged by the force of compression springs on each side. The sliding half of the clutch moves axially along a splined shaft.

The restraint system has eight locking devices—two devices per joint locking the joint against movement in either direction (upward or downward). To release the restraint in either direction, four locking devices must be deactivated. The mechanism is fail-safe; it is locked when release devices are deactivated.

There are a total of four joints; two located above and behind the passenger (shoulder joints) and two located in front of the passenger (elbow joints). Each joint has a three-piece clutch set. The central piece rotates and ratchets when one of the side pieces is disengaged from it.

The preferred embodiment of the restraint mechanism utilizes polyurethane air bags such as those described in U.S. Pat. No. 5, 182,836 to Burkat, and assigned to the assignee of the present invention. To release the locking devices, air pressure of 10–15 psig is provided to the air bags. In the preferred embodiment, each vehicle carries an air tank to provide pneumatic pressure to the air bags. In alternate embodiments, one or more vehicles can share an air source, which may be an air tank or any other suitable air source or pressure source.

When an air tank is used, air can be provided to the tank by 1), a pneumatic cylinder located behind each vehicle's seats; 2), by using a high pressure tank which is pressurized once a day; or, 3) by using a low pressure tank which is automatically pressurized every time a vehicle enters the dispatch station. Air is provided to the restraints by compressing a prelubricated spring return pneumatic cylinder located behind each vehicle seat. A cam wheel on each vehicle is connected through linkages to the cylinder. When the cam wheel contacts a ramp at the ride dispatch area, it acts upon the cylinder and provides the required air pressure and volume to the air bags. When the bags are inflated, they cause one of the outer tooth clutch pieces to be pushed away from the central piece, allowing it to rotate in the desired direction. A cable winds around the central clutch piece that moves the restraint up or down. When the gas spring is compressed, the restraint mechanism is down; when the spring is extended, the restraint is up.

In the preferred embodiment, there are several ways for the release devices to be activated, including: 1) By the vehicle cam during normal operation; 2) By an operator on either side of the vehicle using air stored in the vehicle's air tank; and 3) By an operator from the back of the vehicle utilizing mechanical means.

In operation, during the ride and while the vehicle approaches the dispatch area, the restraint mechanism is locked against moving up or down. As the vehicle approaches the dispatch area, the vehicle's cam wheel contacts the ramp and releases the restraint system allowing the restraint to move further down, if sufficient force is applied to it.

When the vehicle comes to a complete stop, an operator activates a rail that acts on the cam wheel, which, in turn, allows the restraint system to be moved upward, but prevents it from being pulled down, if force is applied. This allows the restraint to be used to assist passengers entering or exiting the vehicle.

After the next set of passengers have entered the vehicle, the operator deactivates the rail, which allows the restraint to be pulled downward, but prevents it from being moved upward.

After the vehicle leaves the dispatch area, its cam wheel no longer contacts the ramp, and the restraint is completely locked against movement in either direction.

PASSENGER RESTRAINT SYSTEM

Figure 1:
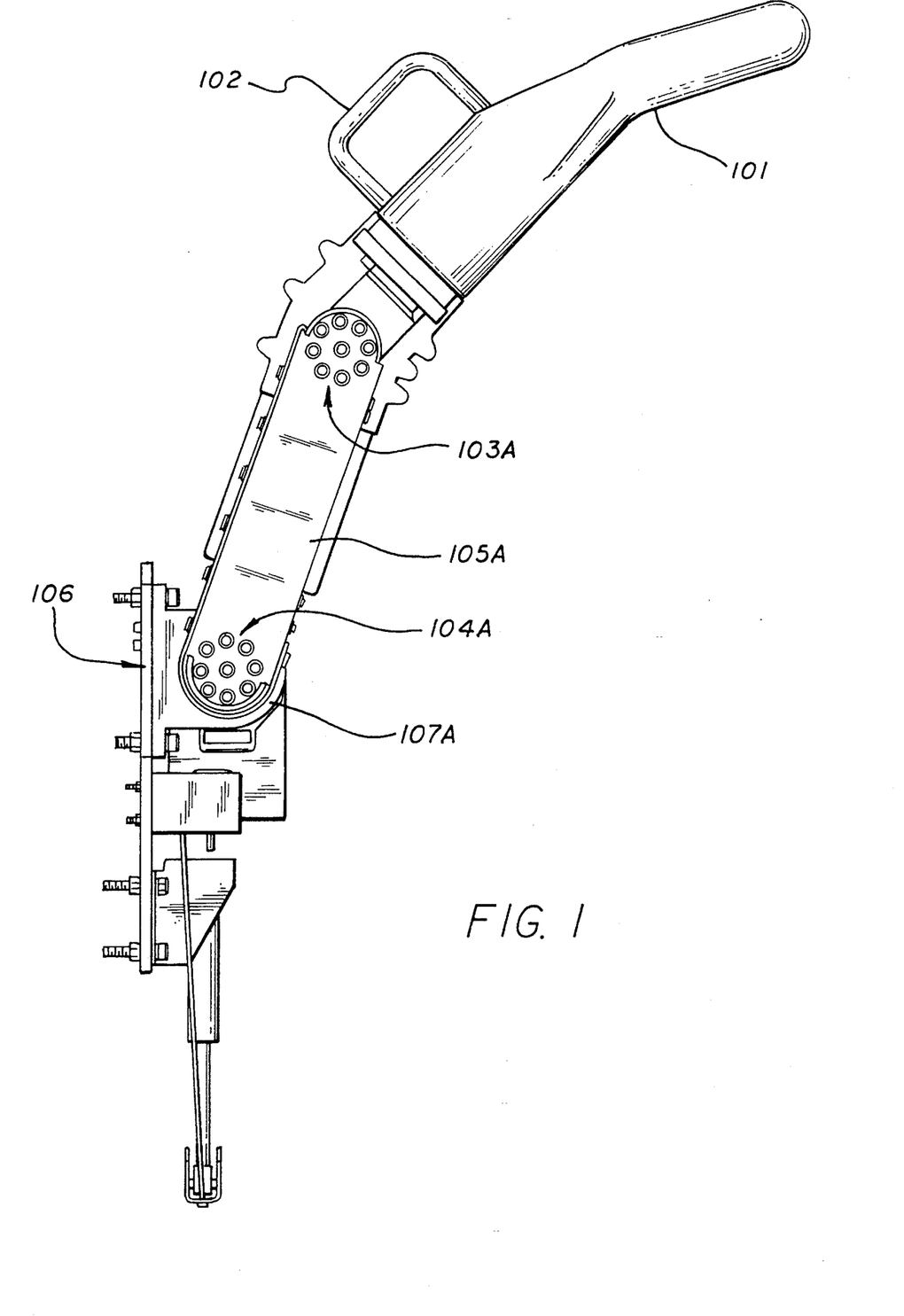
FIG. 1 is a side view of the present invention.

FIG. 1 is a side view of the present invention. A U-shaped restraining bar 101 is pivotally mounted to extension bar 105A at pivot point 103A. Extension bar 105A is itself pivotally mounted to support plate 107A at pivot point 104A. Support plate 107A is mounted to back plate 106.

As can be seen in FIG. 1, the present invention has two pivot points, 103A and 104A. This permits greater adjustability of the restraint for passengers of different sizes. The pivot point 104A is located above and behind the shoulders of the passenger. By rotating the entire restraint assembly about pivot point 104A, extension bar 105A is made to rest on or near the shoulders of the passenger (depending on the size of the passenger). By rotating the restraint bar 101 about pivot point 103A, the restraint bar is made to contact the torso of any size passenger. This differs from prior art systems, where the restraint bar forms a fixed dimension zone about the passenger, with no possibility of adjustment.

Figure 6A:
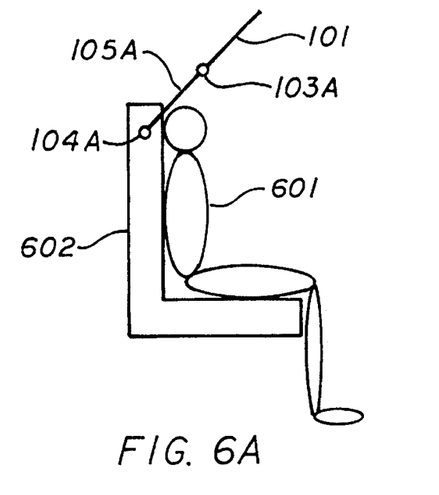
FIGS. 6A–6F illustrate the operation of the present invention with passengers of various sizes.

The operation of the present invention is illustrated in FIGS. 6A–6F. Referring first to FIG. 6A, the restraint bar 101 is shown in a raised position, allowing a guest 601 to be seated in seat 602. The restraint is shown mounted above and behind the shoulders of the passenger 601 at pivot point 104A.

Figure 6B:
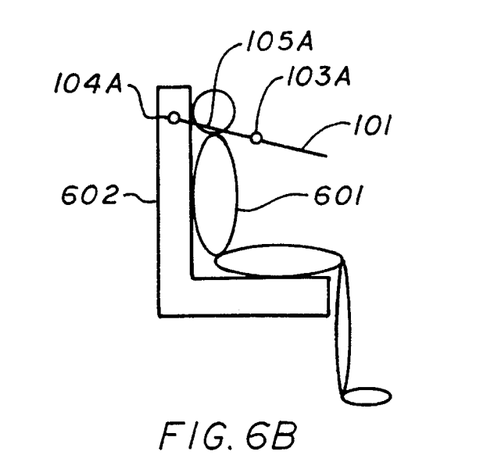

In FIG. 6B, the extension member 105A is pivoted about pivot point 104A so as to bring it down to the shoulders of the passenger 601. As is illustrated, the extension arm 105A is out of the line of sight of the passenger, making for a more enjoyable ride, and reducing the likelihood that the passenger's head will strike the restraint system during the ride.

Figure 6C:
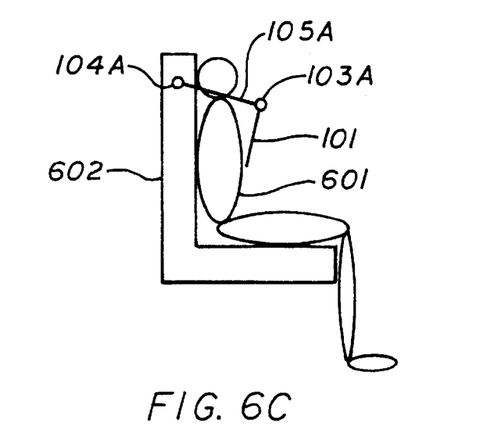

In FIG. 6C, the restraint bar 101 is rotated about pivot point 103A so that it rests against the torso of the passenger 601. Because of the double pivot point system of the invention, the passenger has a large degree of flexibility to adjust the restraint bar 101 for fit and comfort.

Figure 6D:
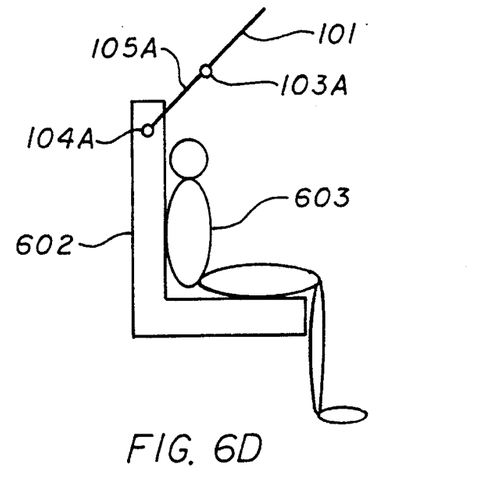
Figure 6E:
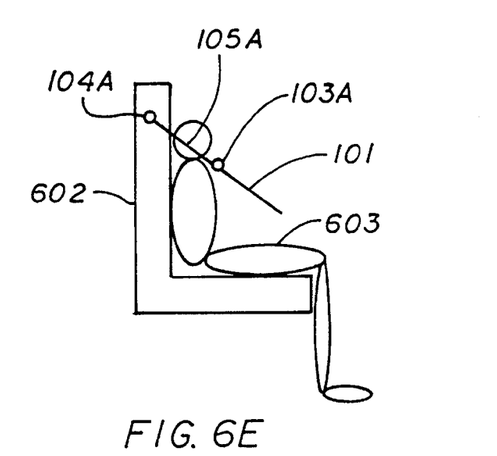
Figure 6F:
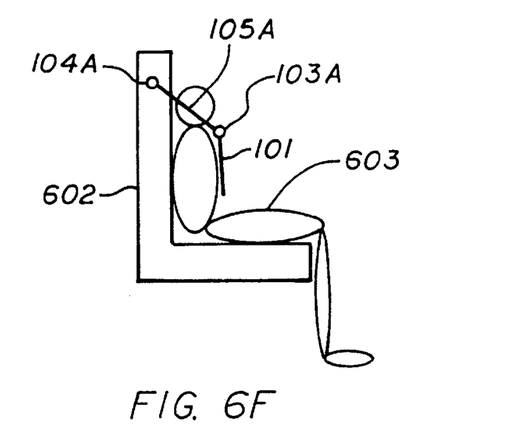

FIGS. 6D–6F illustrate the flexibility of the invention for a shorter passenger 603. First, in FIG. 6D, the restraint is elevated away from seat 602, so that passenger 603 can easily enter and sit in the vehicle seat. In FIG. 6E, the extension arm 105A is rotated about pivot point 104A so that it rests adjacent the shoulders of passenger 603. The amount of rotation of extension arm 105A is greater for the shorter passenger 603 than for taller passenger 601.

In FIG. 6F, passenger 603 adjusts the restraint bar 101 by rotating it about pivot point 103A. Restraint bar 101 is adjusted so that it abuts the torso of passenger 603. As is illustrated in FIGS. 6A–6F, the present invention provides superior flexibility in accommodating passengers of different sizes.

Figure 2:
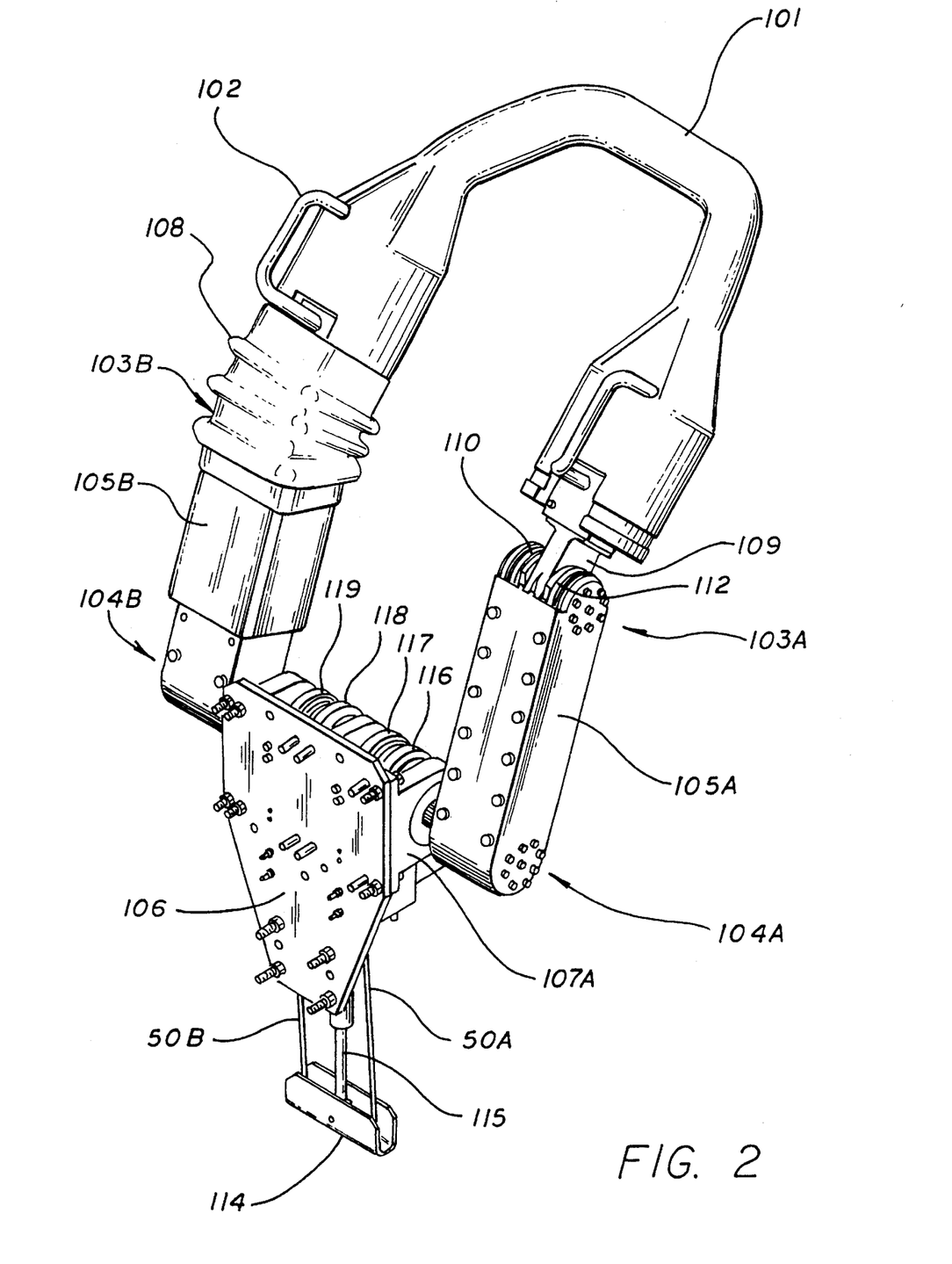
FIG. 2 is a rear perspective view of the present invention.

FIG. 2 is a perspective view of the preferred embodiment of FIG. 1. In FIG. 2, the U-shaped arm 101 can be seen extending from pivot point 103A on extension arm 105A to pivot point 103B on extension arm 105B. Extension arm 105B is pivotally mounted to plate 107B. Restraint arm 101 is coupled to pivot point 103 by means of center elbow clutch 109.

The motion of arm 101 about pivot point 103 is controlled by clutch plates 110 and 112. Each of pivot points 103A, 104A, 103B, 104B is controlled by two clutch plates. One clutch plate prevents movement in the clockwise direction while the other clutch plate prevents movement in the counter clockwise direction. When both clutch plates are engaged, no movement is possible. When only one clutch plate is disengaged, movement in only one direction is possible.

Pivot point 104A is controlled by clutch 118 and 119. Pivot 104B is controlled by clutch plates 116 and 117. The clutch plates for pivot points 104A and 104B are located in between extension arms 105A and 105B. The restraints bar 101 and extension arms 105A and 105B are urged upwards by spring force. This makes it easier to lift the bar when the passenger wishes to disembark from the ride. When engaging the restraint bar, the passenger uses body weight to pull the arm down overcoming the urgent spring force.

CLUTCH PLATE ASSEMBLY

Figure 3:
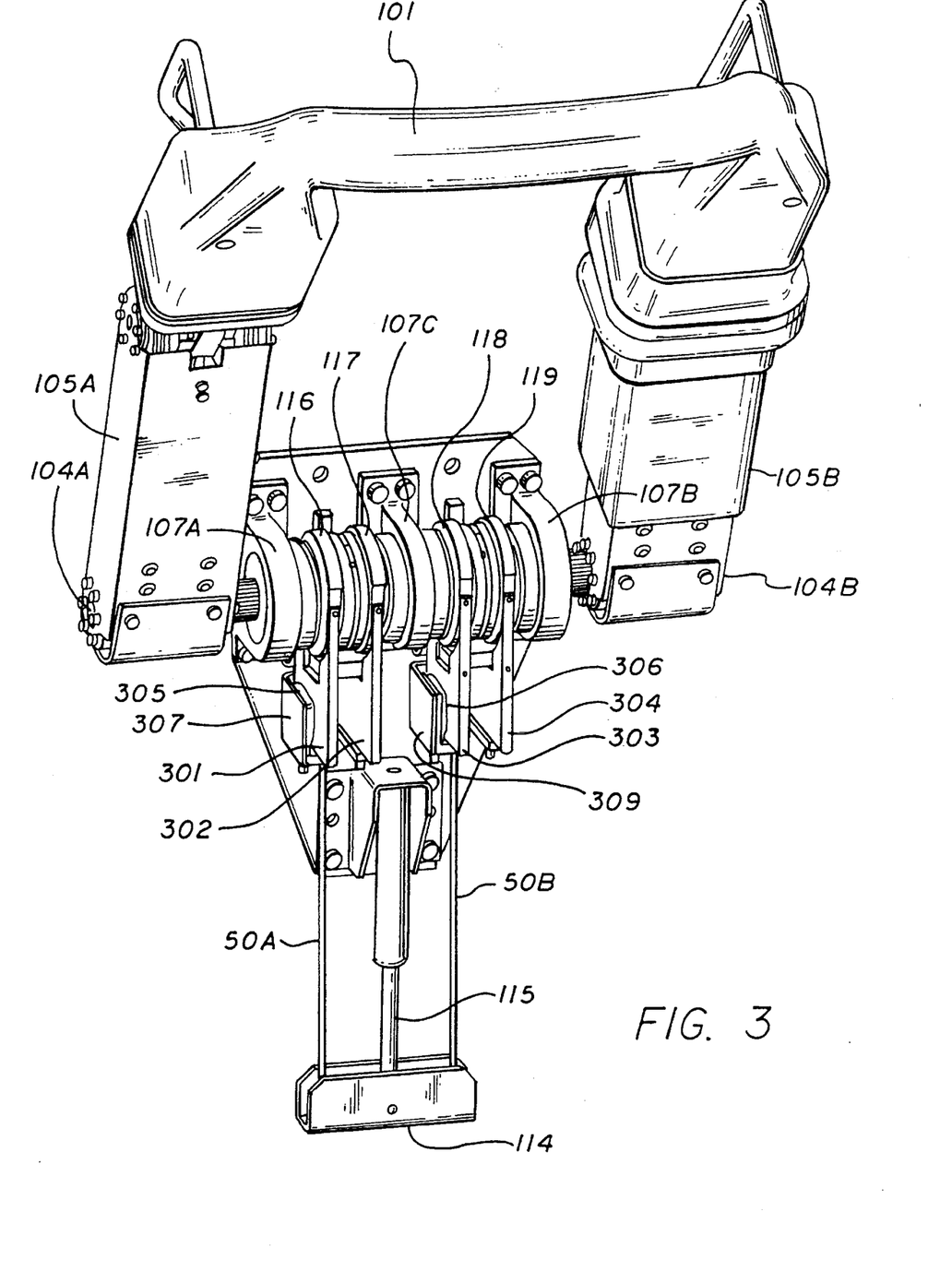
FIG. 3 is a front perspective view of the present invention.
Figure 4:
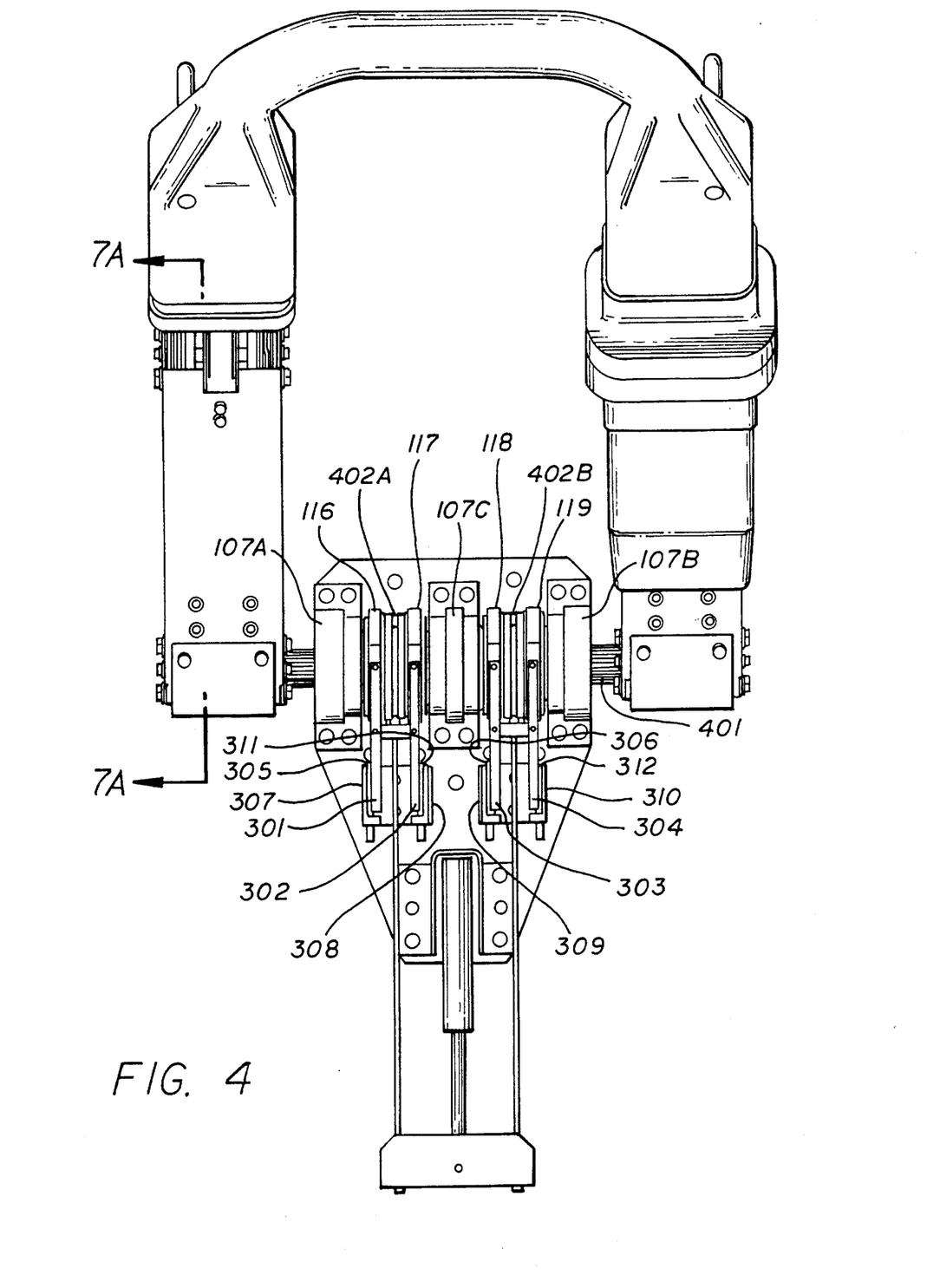
FIG. 4 is a front view of the present invention.

FIGS. 3 and 4 illustrate the mechanism for engaging and disengaging the clutch plates of pivot points 104A and 104B. Attached to each of clutch plates 116–119 is a rocker plate 301–304 respectively. Referring to clutch plate 116, rocker plate 301 is disposed adjacent plate 307. A pneumatic bladder 305 is disposed between rocker plate 301 and plate 307. When bladder 305 is inflated, rocker plate 301 is urged away from plate 307. This causes the clutch plate 116 to move in the opposite direction, away from the center mounting plate and towards the pivot point 104A. This disengages clutch plate 116 permitting movement in one direction.

Referring now to clutch plate 118, its associated rocker plate 303 is disposed adjacent plate 308. A pneumatic bladder 306 is interposed between rocker plate 303 and side plate 309. When the bladder is inflated, the bottom of rocker plate 303 is urged towards pivot point 104B. This urges clutch plate 118 towards bearing shoulder 107C. This disengages clutch 118, permitting movement in one direction of extension arm 105B about pivot point 104B.

A front view of the clutch plate and rocker plate mechanism of FIG. 3 is illustrated in FIG. 4. Rocker plate 301 is controlled by bladder 305 and acting against surface plate 307. Rocker plate 302 is controlled by bladder 311 acting against surface 308. Rocker plate 303 is controlled by bladder 306 acting against surface plate 309 and rocker plate 304 is controlled by bladder 312 acting against surface plate 310.

In the preferred embodiment, the pivot points 104A and 104B are coupled to a splined shaft 401. The splined shaft is inserted through openings in center bearing shoulder 107C and left and right bearing shoulders 107A and 107B. The bearing shoulders 107, 107B and 107C act as bearings and support and permit rotation of the shaft 401.

Center clutch plates 402A and 402B are press fitted to the shaft so that, as the shaft rotates, the center clutch plates 402A and 402B rotate. Center clutch plate 402A is engaged by down clutch plate 116 and up clutch plate 117. When engaged, down clutch plate 116 prevents movement in the down direction and permits movement in the tip direction. When disengaged, down clutch permits movement in the downward direction. Down clutch plate 116 has a tooth pattern on its face adjacent the center clutch plate. The tooth pattern alternates 45° and 90° faces. In the direction of the 45° tooth faces, a corresponding tooth pattern on the center clutch plate can slide, permitting movement. In the direction of the 90° face, travel is prevented. The down plate functions as a ratchet when engaged, permitting movement in the upward direction (45° face) but preventing movement in the downward direction. This allows upward movement when the up clutch is disengaged, without the need to disengage the down clutch.

When bladder 305 is inflated, movement of rocker plate 301 causes the down clutch plate 116 to be disengaged. This disengages the opposing 90° tooth surfaces, so that rotation of the shaft resulting in downward movement of the restraint system can occur.

Center clutch plate 402A is engaged on the opposite surface by up clutch plate 117. When engaged, up clutch plate 117 prevents movement in the up direction and permits movement in the down direction. When disengaged, up clutch permits movement in the upward direction. Up clutch plate 117 has a tooth pattern on its face adjacent the center clutch plate. The tooth pattern alternates 45° and 90° faces. In the direction of the 45° tooth faces, a corresponding tooth pattern on the center clutch plate can slide, permitting movement. In the direction of the 90° face, travel is prevented. The up plate functions as a ratchet when engaged, permitting movement in the downward direction (45° face) but preventing movement in the upward direction. This allows downward movement when the down clutch is disengaged, without the need to disengage the up clutch.

When bladder 311 is inflated, movement of rocker plate 302 causes the up clutch plate 117 to be disengaged. This disengages the opposing 90° tooth surfaces, so that rotation of the shaft resulting in upward movement of the restraint system can occur.

The configuration and operation of center clutch plate 402B and its associated down and up clutch plates 118 and 119 is the same as described above.

The elbow joint clutch assembly at pivot point 103A operates somewhat differently in the preferred embodiment. The restraint arm is coupled to center elbow clutch 109 (FIG. 2). Center elbow clutch 109 includes a center opening that receives a shaft. Center elbow clutch 109 acts as a bearing on the shaft, rotating about the shaft. Center elbow clutch 109 rotates freely about the shaft unless engaged by up and down clutch plates 110 and 112 respectively. As with the assembly described above, the down clutch prevents movement in the down direction, but permits movement in the up direction when engaged. Similarly, the up clutch prevents movement in the up direction, but permits movement in the down direction when engaged.

PNEUMATIC SYSTEM

Figure 5:
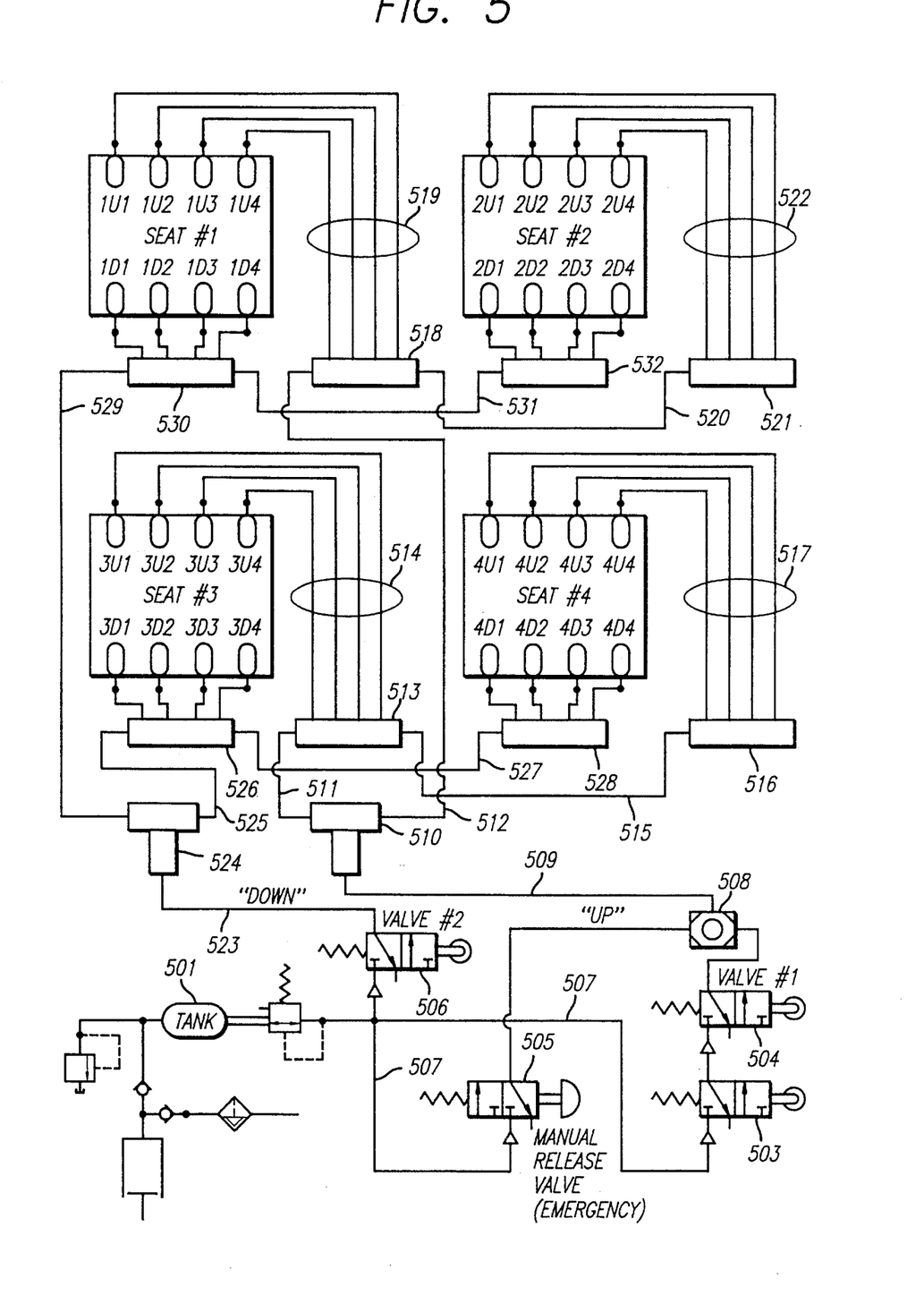
FIG. 5 is a diagram of the pneumatic system of the present invention.

The pneumatic system for one embodiment of the present invention is illustrated in FIG. 5. FIG. 5 shows the use of a single air tank 501 to provide air for pneumatic bladders at four passenger seat locations, seat numbers 1–4. The air tank is coupled through line 507 to up valves 503 and 504, and down valve 506. Although two valves are used to control the air flow to the up bladders, one valve or some other number of valves can be used to control air flow to the up bladders or down bladders.

The "up" bladders are those pneumatic air bladders that, when inflated, permit the motion of the passenger restraint in the upward direction. The "down" bladders are those that, when inflated, permit the motion of the passenger restraint in the downward direction. Each joint (four per passenger) has an associated up bladder and down bladder. The "up" valve refers to a valve that controls air flow to the up bladders. The "down" valve controls air flow to the down bladders.

The output of the up valves 503 and 504 is coupled to node 508. node 508 is also coupled to manual release valve 505. The purpose of the manual control valve is to supply air to "up" bladders to allow the restraint to go up. It is to be used when the vehicle is away from the station where control rail which acts on valves 503, 504 and 506 is located.

Node 508 is coupled through line 509 to node 510. Node 510 has two outputs, line 511 to control the upper bladders of seats 3 and 4, and line 512 to control the upper bladders of seats 1 and 2. Line 511 is coupled to manifold 513. Manifold 513 provides four outputs 514 to the upper bladders 3U1–3U4 of seat number 3, and line 515 to manifold 516. Manifold 516 provides outputs 517 to upper bladders 4U1–4U4 of seat number 4.

Line 512 is coupled to manifold 518. Manifold 518 provides outputs 519 to control the upper bladders 1U1–1U4 of seat number 1, and output 520 to manifold 521. Manifold 521 provides outputs 522 to control upper bladders 2U1–2U4 of seat number 2.

Valve 506 provides an output 523 to node 524. Node 524 has two outputs, line 529 to control the lower bladders of seats 1 and 2, and line 525 to control the lower bladders of seats 3 and 4. Line 525 is coupled to manifold 526. Manifold 526 provides four outputs to the lower bladders 3D1–3D4 of seat number 3, and line 527 to manifold 528. Manifold 528 provides four outputs to lower bladders 4D1–4D4 of seat number 4.

Line 529 is coupled to manifold 530. Manifold 530 provides four outputs to control the lower bladders 1D1–1D4 of seat number 1, and output 531 to manifold 532. Manifold 532 provides four outputs to control lower bladders 2D1–2D4 of seat number 2.

When the vehicle is ready to receive passengers, the restraint is in an up position, and the down valve is set to deflate the bladders, resulting in the restraint being locked against movement in the dawn direction. After passengers enter the cars and are seated, an operator activates the down valve so that air is pumped to the down bladders and is exhausted from "up" bladders. The down bladders, when inflated, release the clutch plates at each joint that prevent downward movement. Each passenger then pulls the restraint bar down until it rests against the passengers torso.

When the vehicle leaves the loading area, neither the up nor down bladders are activated, and the restraint bar cannot be moved in either direction. When the vehicle returns to the loading area, the operator activates the up bladders, permitting the restraint bars to be lifted away from the passenger. The down bladders are deactivated, so that downward movement of the restraint bar is prevented. As a result, the passenger can use the restraint bar to assist in rising and exiting the vehicle.

In one embodiment of the invention, the restraint bar is spring biased so as to provide assistance to rotate it away from the passenger during exiting. One spring mechanism is used to rotate the restraint bar about the shoulder joints (104A and 104B) and a second spring system rotates the restraint bar about elbow joints (103A and 103B).

A gas spring and cable system is used to rotate the restraint bar about pivot points 104A and 104B when the up clutches are unlocked. This provides assist to a passenger attempting to lift the restraint and exit the ride vehicle. The urgent force of the torsion spring can be overcome when the restraint is lowered by the passenger's weight pulling down on the restraint bar. Referring to FIGS. 2 and 3, a gas spring 115 pushes against a cable anchor plate 114. Cables 50A and 50B are coupled to the anchor plate 114 and to the shoulder plates 402A and 402B, or alternatively, to the shoulder pivot shaft, so that as the gas spring is extended, the cables cause the shaft to be rotated, lifting the restraint arm about shoulder pivot points 104A and 104B.

Figures 7A, 7B:
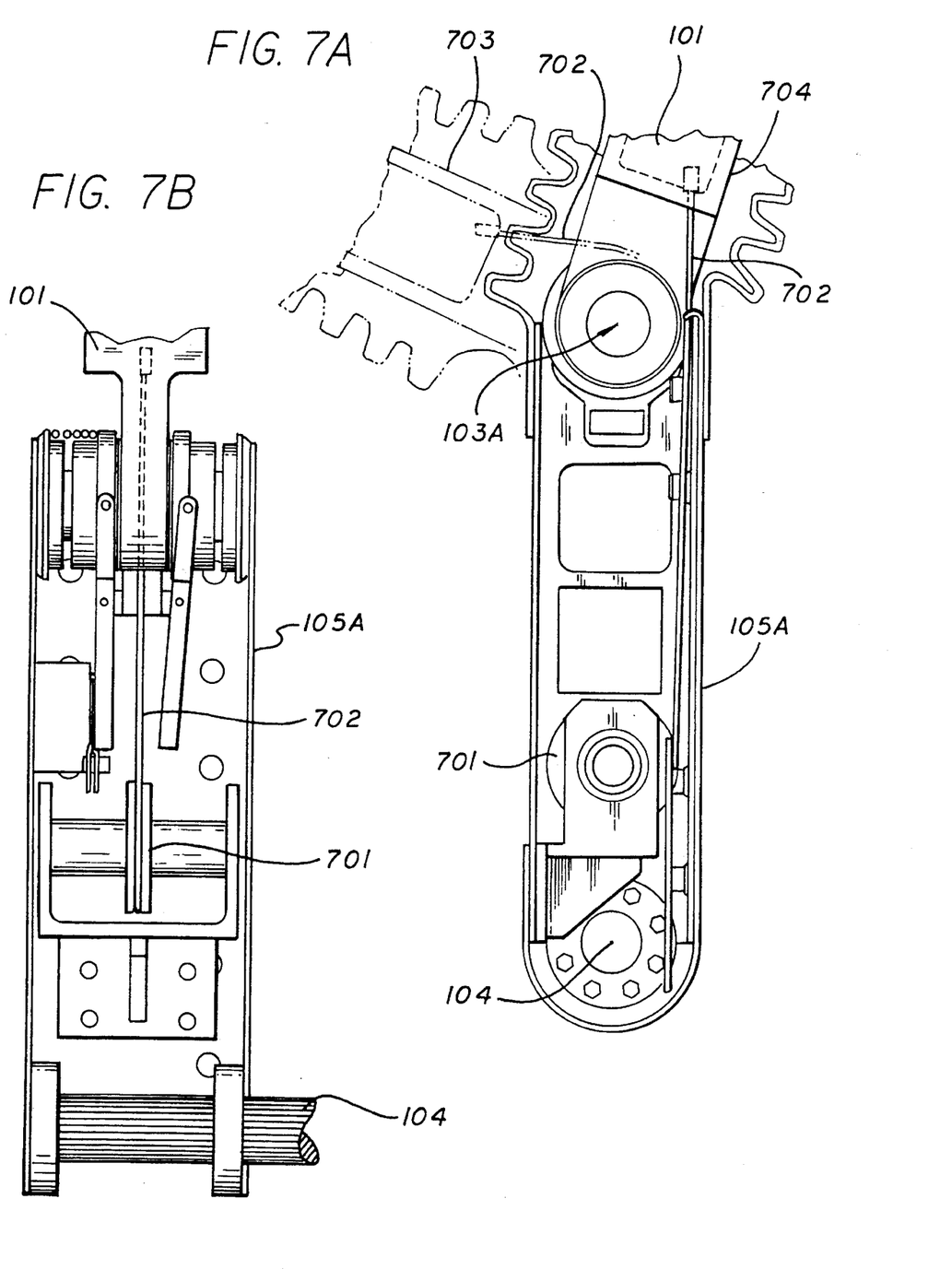
FIGS 7A and 7B illustrate spring means for urging a restraint arm about elbow joints.

The spring means for urging the restraint arm about the elbow joints 103A and 103B is illustrated in FIGS. 7A and 7B. Only the system for extension arm 105A is illustrated, an identical system may be used for extension arm 105B. Mounted within extension arm 105B is a torsion spring 701. Cable 702 is coupled at one end to the torsion spring 701 and at another end to the restraint arm 101. Action of the torsion spring 701 is such as to rotate the restraint arm 101 about elbow joint 103A to increase the angle restraint arm 101 makes with extension arm 105A. This is illustrated by the two positions 703 and 704 of restraint arm 101 in FIGS. 7A and 7B.

Although gas springs and torsion springs are illustrated herein to provide assistance in moving the restraint bar in one direction, other types of springs may be used without departing from the scope of the present invention. In addition, if desired, spring bias may be only provided either the elbow joints or shoulder joints, or at any combination of both shoulder joints and both shoulder joints.

Thus, a passenger restraint system has been described.

I claim:

1. A passenger restraint system comprising:

a restraint bar having first and second ends, said first end of said restraint bar pivotally mounted at a first pivot point to a first end of a first extension bar, said second end of said restraint bar pivotally mounted at a second pivot point to a first end of a second extension bar;

said first extension bar pivotally mounted at a third pivot point at a second end of said first extension bar to a support plate;

said second extension bar pivotally mounted at a fourth pivot point at a second end of said second extension bar to said support plate;

locking means that selectably permit and prevent pivoting motion at said first, second, third, and fourth pivot points, each of said locking means comprising a clutch plate assembly.

2. The passenger restraint of claim 1 wherein said clutch plate assembly comprises:

a center clutch plate for rotating in first and second directions about a pivot point;

an up clutch plate for preventing motion in said first direction when engaged and for permitting motion in said first direction when disengaged;

a down clutch plate for preventing motion in said second direction when engaged and for permitting motion in said second direction when disengaged.

3. The passenger restraint of claim 2 wherein said up clutch plate permits motion in said second direction at all times and said down clutch permits motion in said first direction at all times.

4. The passenger restraint of claim 1 wherein said clutch assembly utilizes toothed clutch plates.

5. The passenger restraint of claim 2 wherein said up clutch plate is disengaged by inflating a first pneumatic bladder, causing said up clutch plate to be moved away from said center clutch plate.

6. The passenger restraint of claim 5 wherein said down clutch plate is disengaged by inflating a second pneumatic bladder, causing said down clutch plate to be moved away from said center clutch plate.

7. A passenger restraint system comprising:

a U-shaped restraint bar having first and second ends, said first end of said restraint bar pivotally mounted at a first elbow joint to a first end of a first extension bar, said second end of said restraint bar pivotally mounted at a second elbow joint to a first end of a second extension bar;

said first extension bar pivotally mounted to a support plate at a first shoulder joint at a second end of said first extension bar to a support plate;

said second extension bar pivotally mounted to a support plate at a second shoulder joint at a second end of said second extension bar;

locking means that selectably permit and prevent pivoting motion at said first and second elbow joints and at said first and second shoulder joints, wherein each of said locking means comprises a clutch plate assembly.

8. The passenger restraint of claim 7 wherein said clutch plate assembly comprises:

a center clutch plate for rotating in first and second directions about a joint;

an up clutch plate for preventing motion in said first direction when engaged and for permitting motion in said first direction when disengaged;

a down dutch plate for preventing motion in said second direction when engaged and for permitting motion in said second direction when disengaged.

9. The passenger restraint of claim 8 wherein said up clutch plate is disengaged by inflating a first pneumatic bladder, causing said up clutch plate to be moved away from said center clutch plate.

10. The passenger restraint of claim 9 wherein said down clutch plate is disengaged by inflating a second pneumatic bladder, causing said down clutch plate to be moved away from said center clutch plate.

11. The passenger restraint of claim 10 further comprising control means for controlling inflation of said first bladder and said second bladder.

12. The passenger restraint of claim 11 wherein said control system causes said first bladder to be inflated and said second bladder to be deflated during a first mode of operation.

13. The passenger restraint of claim 12 wherein said control system causes said first bladder to be deflated and said second bladder to be inflated during a second mode of operation.

14. The passenger restraint of claim 13 wherein said control system causes said first bladder and said second bladder to be deflated during a third mode of operation.

15. The passenger restraint of claim 14 wherein said passenger restraint is coupled to a seat and:

said first mode of operation is when a passenger enters said seat;

said second mode of operation is when said passenger engages said passenger restraint; and said third mode of operation is when said seat is in motion.

16. The passenger restraint of claim 8 wherein said up clutch plate permits motion in said second direction at all times and said down clutch permits motion in said first direction at all times.

17. The passenger restraint of claim 7 wherein said clutch assembly utilizes toothed clutch plates.

18. A passenger restraint system comprising:

a restraint bar pivotally mounted at a first pivot point to a first end of an extension bar;

a second end of said extension bar pivotally mounted at a second pivot point to a support plate;

said extension bar lying in a plane having a variable angle with respect to ground;

locking means that selectably permits and prevents pivoting motion at said first and second pivot points, each of said locking means comprising a clutch plate assembly.

19. The passenger restraint of claim 18 wherein said clutch plate assembly comprises:

a center clutch plate for rotating in first and second directions about a pivot point;

an up clutch plate for preventing motion in said first direction when engaged and for permitting motion in said first direction when disengaged;

a down clutch plate for preventing motion in said second direction when engaged and for permitting motion in said second direction when disengaged.

20. The passenger restraint of claim 19 wherein said up clutch plate is disengaged by inflating a first pneumatic bladder, causing said up clutch plate to be moved away from said center clutch plate.

21. The passenger restraint of claim 20 wherein said down clutch plate is disengaged by inflating a second pneumatic bladder, causing said down clutch plate to be moved away from said center clutch plate.

22. The passenger restraint of claim 19 wherein said up clutch plate permits motion in said second direction at all times and said down clutch permits motion in said first direction at all times.

23. The passenger restraint of claim 18 wherein said clutch plate assembly utilizes toothed clutch plates.

* * * * *

UNITED STATES PATENT AND TRADEMARK OFFICE
CERTIFICATE OF CORRECTION

PATENT NO. : 5,529,382
DATED : June 25, 1996
INVENTOR(S) : Burkat, Alexander et al.

It is certified that error appears in the above-identified patent and that said Letters Patent is hereby corrected as shown below:

On the title page, item [73] should read as follows:

--[75] Inventors: Alexander Burkat, Placentia, California, Daniel A. Armstrong, Simi Valley, California, William E. Pedersen, Camarillo, California Signed and Sealed this Twenty-sixth Day of November 1996

Attest:

BRUCE LEHMAN

Attesting Officer   Commissioner of Patents and Trademarks